United States Patent [19]

Williams

[11] Patent Number: 5,761,525

[45] Date of Patent: Jun. 2, 1998

[54] METHOD AND SYSTEM FOR SCHEDULING THE PLAYBACK OF A MULTIMEDIA PRESENTATION

[75] Inventor: Marvin L. Williams, Lewisville, Tex.

[73] Assignee: International Business Machines Corporation, Armonk, N.Y.

[21] Appl. No.: 634,324

[22] Filed: Apr. 18, 1996

Related U.S. Application Data

[63] Continuation of Ser. No. 210,835, Mar. 17, 1994, abandoned.

[51] Int. Cl.[6] ........................................ G06F 3/00
[52] U.S. Cl. ........................................ 395/806
[58] Field of Search ................................ 395/119, 963, 395/936, 140, 806

[56] References Cited

U.S. PATENT DOCUMENTS

| | | | |
|---|---|---|---|
| 4,626,836 | 12/1986 | Curtis et al. | 340/706 |
| 4,819,191 | 4/1989 | Scully et al. | 364/518 |
| 5,050,077 | 9/1991 | Vincent | 365/401 |
| 5,093,901 | 3/1992 | Cree et al. | 395/100 |
| 5,220,540 | 6/1993 | Nishida et al. | 368/41 |
| 5,248,678 | 9/1993 | Fitzpatrick et al. | 379/201 |
| 5,307,086 | 4/1994 | Griffin et al. | 345/146 |
| 5,365,360 | 11/1994 | Torres | 395/159 |
| 5,367,621 | 11/1994 | Cohen et al. | 395/154 |
| 5,369,570 | 11/1994 | Parad | 364/401 |
| 5,390,138 | 2/1995 | Milne et al. | 395/119 |
| 5,408,659 | 4/1995 | Cavandish et al. | 395/650 |
| 5,420,801 | 5/1995 | Dockter et al. | 364/514 R |
| 5,487,144 | 1/1996 | Takahashi et al. | 395/963 |
| 5,491,626 | 2/1996 | Williams et al. | 364/401 |
| 5,526,018 | 6/1996 | Fisher | 345/127 |
| 5,537,337 | 7/1996 | Williams | 364/514 R |

OTHER PUBLICATIONS

Little, Thomas et al, Interval–Based Conceptual Models for Time–Dependent Multimedia Data. IEEE Transactions on Knowledge and Data Engineering, pp. 551–563, (Aug., 1993).

Chandra, Raskesh et al, Implementing Calendars and Temporal Rules in next Generation Databases, Data Engineering 1994 International Conference, pp. 264–273 (Feb. 1994).

Li, L., et al, Synchronization in Real Time Data Delivery, SUPERCOMM/ICC '92: Discovering a New World of Communications, pp. 587–591, (1992).

Furht, Borko, Real–Time Issues in Distributive Multimedia Systems, Parallel and Distributive Real Time Systems, pp. 88–97, (1994).

Dreyer, Werner et al, AN Object–Oriented Data Model for a Time Series Management System, Scientific and Statistical Databases, 1994 Seventh Int'l Working Conference, pp. 186–195, (Feb. 1994).

*Primary Examiner*—Joseph H. Feild
*Assistant Examiner*—Rudolph Buchel
*Attorney, Agent, or Firm*—Edward H. Duffield

[57] ABSTRACT

A method and apparatus are provided for scheduling an isochronous playback event to an electronic calendar. In one embodiment, the invention determines the time interval, determines whether the user has a block of time available for playback, and schedules the playback as an event on an electronic calendar. In another embodiment the invention schedules a partial playback time for when a complete playback time can not be scheduled. The invention may be initiated on reception of an isochronous data object by an electronic mail service. The user who requested automatic scheduling of reception on incoming isochronous data objects is notified of any automatic scheduling for playback events and optionally can have electronic reminders generated for scheduled playback events.

9 Claims, 4 Drawing Sheets

METHOD AND SYSTEM FOR SCHEDULING THE PLAYBACK OF A MULTIMEDIA PRESENTATION

This is a continuation of application Ser. No. 08/210,835 filed Mar. 17, 1994 now abandoned.

BACKGROUND OF THE INVENTION

Field of the Invention

The present invention relates to a data processing system capable of playing multimedia presentations and relates more particularly to a data processing system that automatically schedules a playback event of a multimedia presentation to an electronic calendar.

DESCRIPTION OF THE RELATED ART

A data processing system may be capable of playing back, or displaying, multimedia presentations that may contain motion video or audio data. Such multimedia presentations are isochronous in nature; that is, timing characteristics are the basis for conveying information. For example, motion video may be optimally presented by presenting individual video frames in a particular order and at a particular rate of frames per unit of time. Similarly, audio, such as recorded or synthesized speech and recorded or synthesized music, may be optimally presented at a particular rate. Such multimedia presentations may be contrasted with, for example, graphical data or textual information, whose rate of presentation to a human user of the data processing system is not normally significant. Under certain circumstances, however, even text can be considered isochronous, as where a text-to-speech process is used to convert the text to spoken audio speech. Similarly, if the text is presented to the user by scrolling it across the display screen, the scrolling rate, which may be measured in characters or in lines per unit of time, give the presentation of the text isochronous properties.

The optimal rate of presentation of the information in an object that contains isochronous data gives that object an optimal playback duration, which may be expressed in time. Some multimedia objects expressly state their duration; for example, the directory structure of audio compact discs may state the time duration of individual tracks. An isochronous data object differs in this manner from a non-isochronous data object such as a graphical image file—while both objects typically have a file size, which may be expressed in bytes, only the isochronous object also has a time duration, which may be expressed in seconds, minutes or hours or the like.

A data processing system may include an electronic calendar application which allows the user to maintain a schedule of upcoming events of interest. Calendar events typically have a start time and a duration. When adding a new event to a calendar, the calendar application may check the existing calendar events for events that conflict in time with the event to be added. However, data processing systems, even those that include calendar applications, do not schedule an appropriate time when the complete playback of an isochronous data object can occur without conflicting with another event. Previously disclosed by the inventor, U.S. Pat. No. 5,537,337 Playback Conflict Detection Method and Apparatus, allowed users to be notified that activating an isochronous object would conflict with an already scheduled event, but provided no methods to find a subsequent non-conflicting time to activate the isochronous object. Thus, there is a need for a data processing system that schedules an isochronous calendar event which will not conflict with preceding calendar events.

SUMMARY OF THE INVENTION

In accordance with the invention, a method and apparatus are provided for scheduling an isochronous playback event to an electronic calendar. In one embodiment, the invention determines the time interval, determines whether the user has a block of time available for playback, and schedules the playback as an event on an electronic calendar. In another embodiment the invention schedules a partial playback time for when a complete playback time can not be scheduled. The invention may be initiated on reception of an isochronous data object by an electronic mail service. The user who requested automatic scheduling of reception on incoming isochronous data objects is notified of any automatic scheduling for playback events and optionally can have electronic reminders generated for scheduled playback events.

BRIEF DESCRIPTION OF DRAWINGS

The novel features believed characteristic of the invention are set forth in the appended claims. The invention itself however, as well as a preferred mode of use, further objects and advantages thereof, will best be understood by reference to the following detailed description of an illustrative detailed embodiment when read in conjunction with the accompanying drawings wherein:

While the invention will be described in conjunction with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

Figure 1:
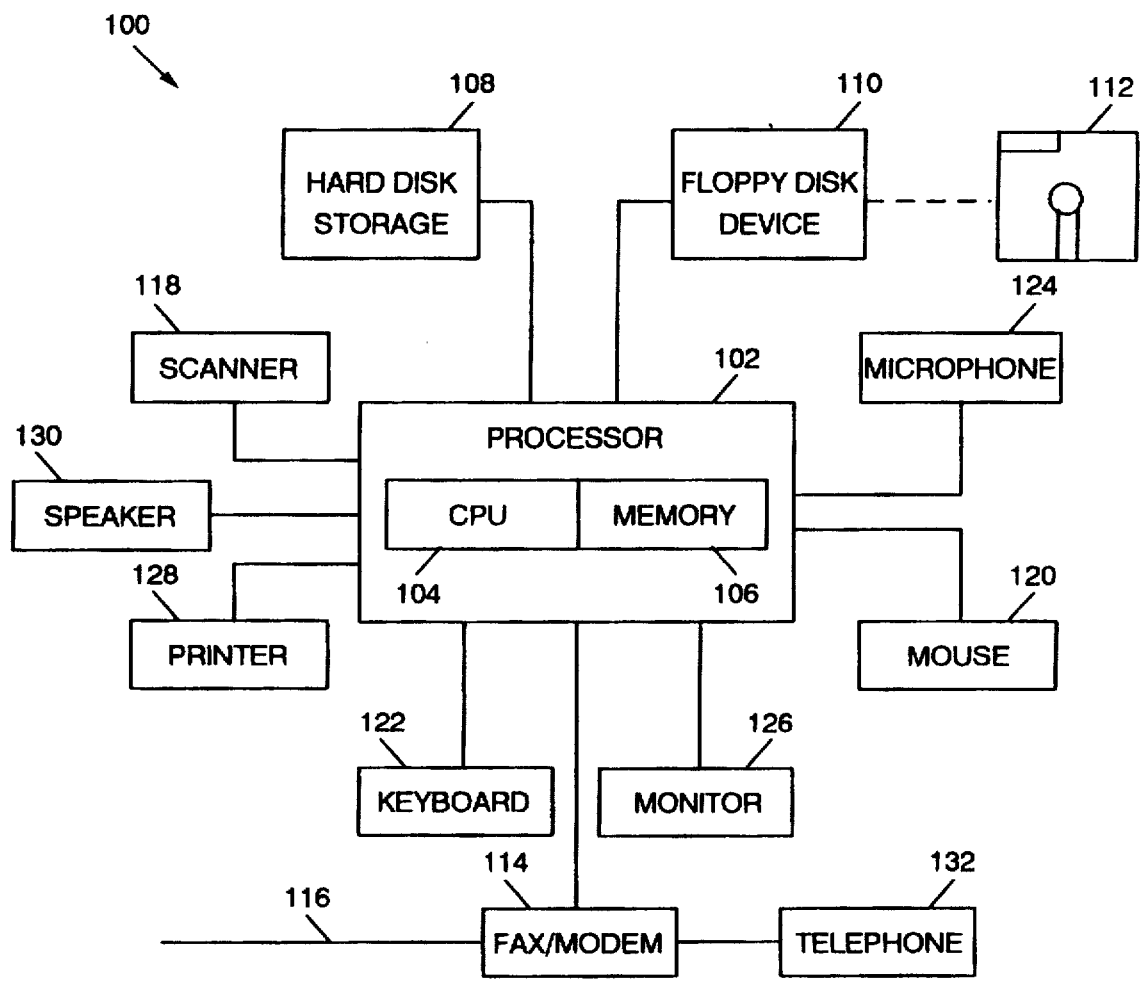
FIG. 1 is a block diagram of an apparatus used in performing the method of a preferred embodiment of the present invention and forming a part of the apparatus of a preferred embodiment of the present invention.

With reference now to the Figures, and in particular with reference to FIG. 1, there is shown, in block diagram form, an apparatus according to the present invention. The apparatus includes a data processing system 100. The data processing system 100 includes a processor 102, which includes a central processing unit (CPU) 104 and memory 106. Additional memory, such as a hard disk file storage 108 and a floppy disk device 110 may be connected to the processor 102. Floppy disk device 110 may write to or read from a removable diskette 112 which may have computer program code recorded thereon that implements portions of the present invention in the data processing system 100. Inputs may also be received from a fax/modem 114, which is connected to a telephone line 116, and from a microphone 124. The data processing system 100 also includes user interface hardware, such as a mouse 120 a keyboard 122 and a scanner 118, for the allowing user input to the processor 102. The data processing system 100 also includes visual display devices, such as monochrome or color display monitor 126 and a printer 128, for rendering visual information. The data processing system may also include an audio output device, such as speaker 130 for rendering audio information. A telephone 132 may be connected to the telephone line 116 through the fa/modem 114.

Figure 2:
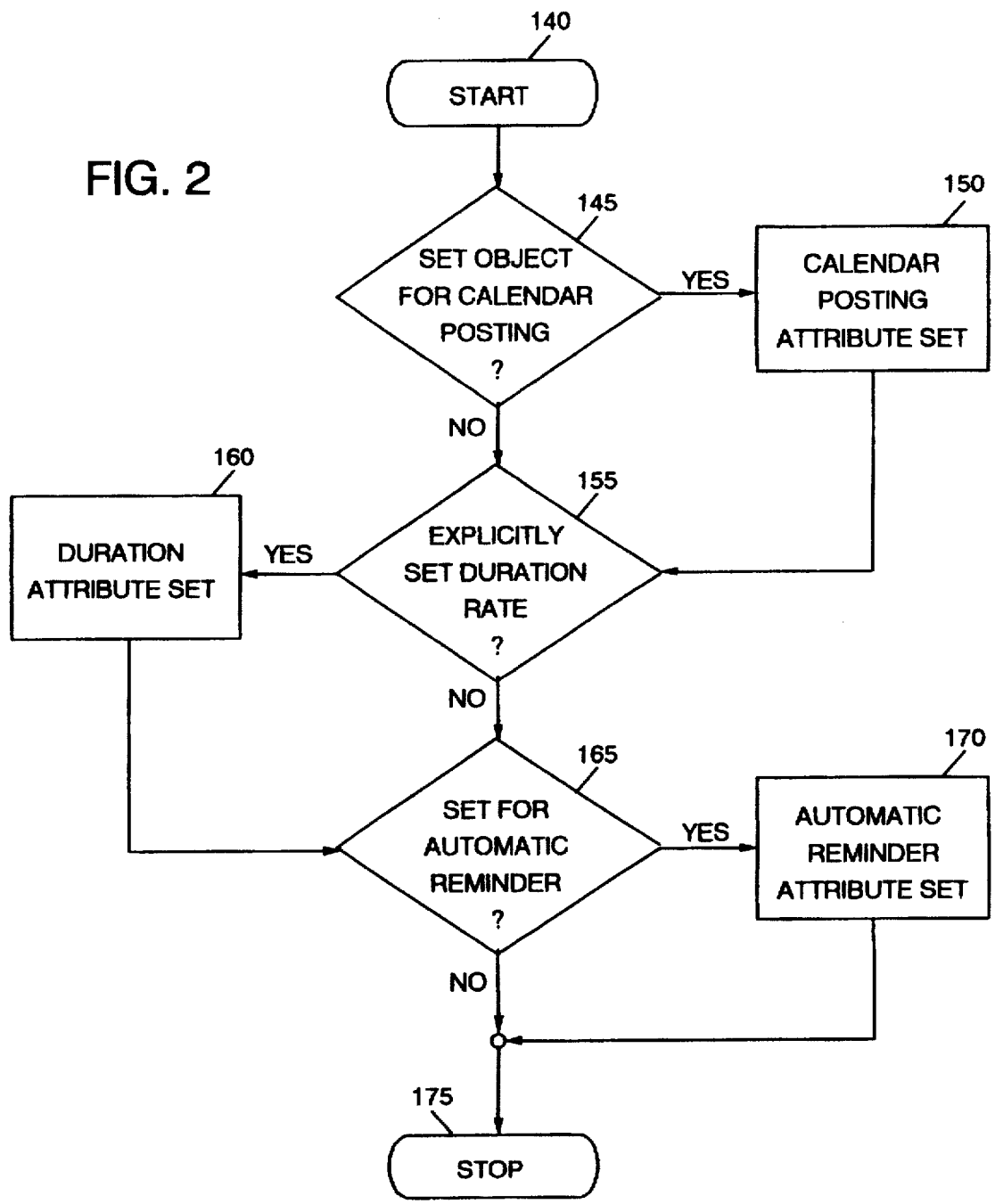
FIG. 2 is a high level logic flickered illustrating the registration process of the preferred embodiment of the method of the present invention.

With reference now to FIG. 2, there is depicted a high level flickered of the registration process. The registration process commences at block 140 when the user makes a registration request. The process proceeds to block 145 which determines whether the object is to be activated for electronic scheduling. Those skilled in the art can appreciate that certain enterprises may desire selectivity of events being posted to a publicly assessable calendar system. The object may be an electronic note consisting of isochronous data or any other data type that can exist as an isochronous object. If the object is desired for posting as an event the process proceeds to block 150 where the object's attributes are set to permit electronic scheduling. The process continues from block 150 to block 155 where a determination is made as to whether the duration of the object is to be explicitly registered with the object. Returning to block 145 if it is determined that the object is not to be posted the process proceeds again to block 155. Alternatively, those skilled in the art recognized that if block 150 determines that no posting is desired for the object then the process may proceed to block 175 where the process terminates, however this alternative does not allow for electronic reminder registration.

Returning to block 155 if the process determines that the duration rate is to be explicitly registered with the object then the process continues to block 160 which sets the duration rate attribute of the object. The process then continues to block 165 which determines whether the object should activate an automatic reminder. Returning to block 155 if a determination is made not to set the duration rate the process continues once again to block 165. If block 165 determines that an automatic reminder is desired then the process continues to block 170 where an automatic reminder attribute is set for the object. The process then proceeds to block 175 where the process terminates. Returning to block 165 if a determination is made not to activate an electronic reminder for the object the process again continues to block 175 where the process terminates.

Figures 3, 3A:
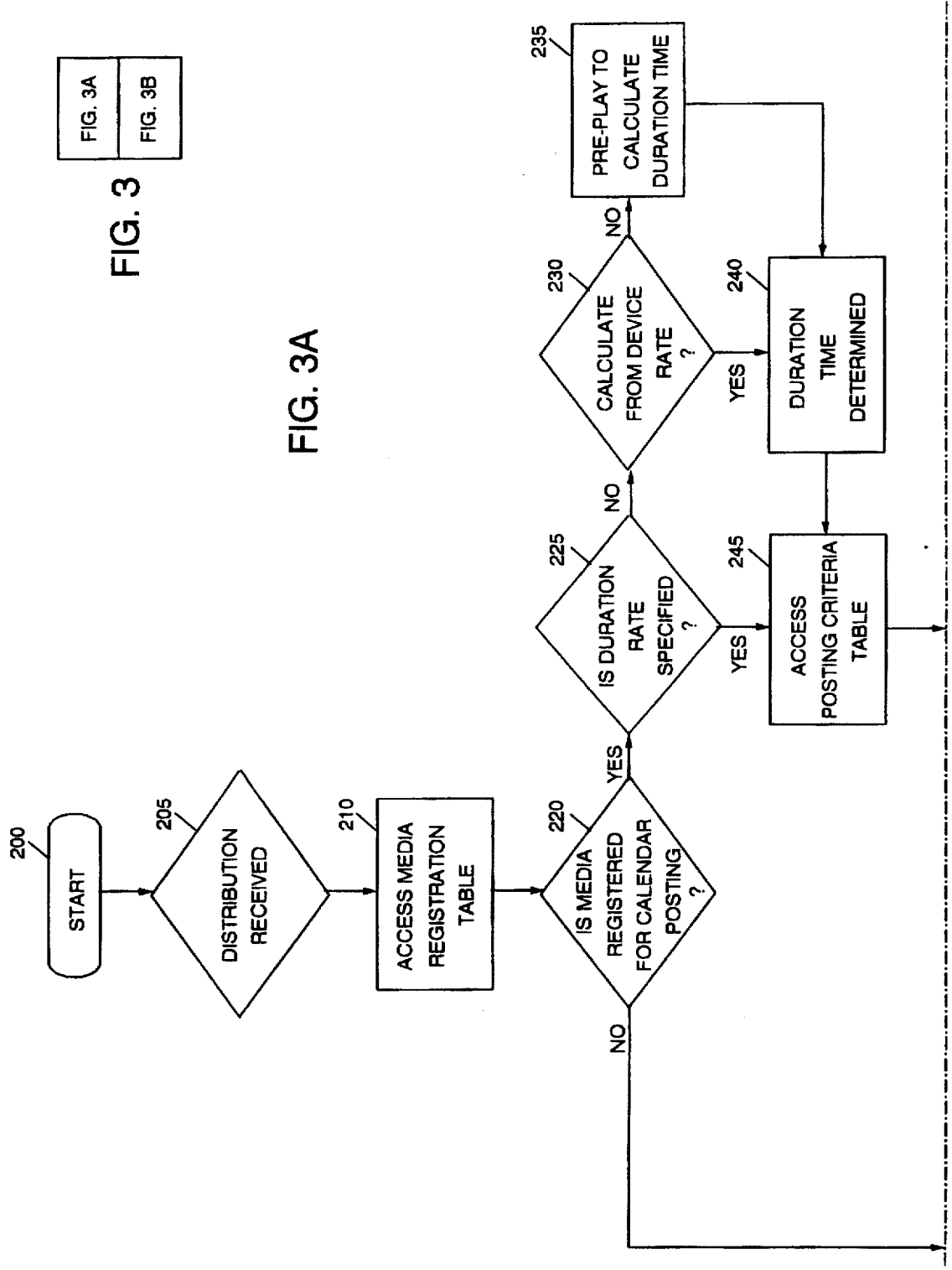
FIG. 3 is a high level logic flickered illustrating the invocation process of the preferred embodiment of the method of the present invention.
Figure 3B:
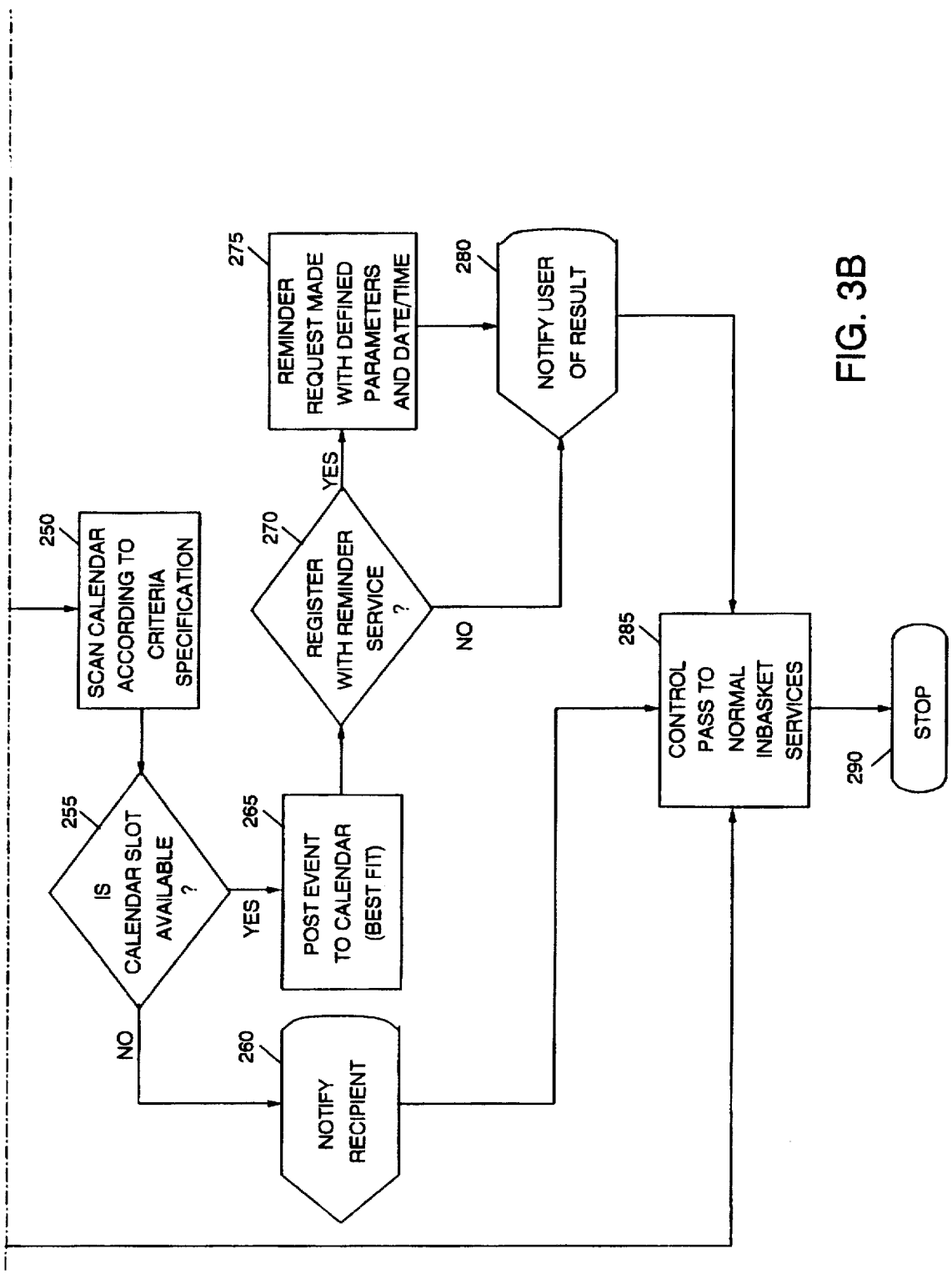

With reference now to FIG. 3, there is depicted a high level flickered of the invocation process of an incoming isochronous data object. The process begins at block 200 and proceeds to block 205 where upon the invention takes receipt of the isochronous data object. The process next proceeds to block 210 where the object's data type is compared to a registration table that contains a list of entries of object types which are registered to activate the invention. If the object received is not of a registered type, such as the object not being isochronous in nature the process continues to 285 where the process relinquishes control to electronic mail inbasket services. Those skilled in the art recognized that a plurality of services may be given control for when the object type is not of a registered type. The process then proceeds to block 290 where the process terminates. Returning to block 220, if block 220 determines the object is of a registered isochronous nature the process proceeds to block 225 which determines whether the duration time is specified as an attribute of the object. If the object does not have an explicit duration time as a characteristic of the object then process proceeds to block 230 where the determination is made on if the duration should be calculated using the playback rate of the isochronous device. For example, the device may be designed to display 60 frames per second, this in conjunction with the number of frames contained in the object can be multiplied to determine the preferred duration of the object. If block 230 determines that the object is not to be calculated from the device rate then the process continues to block 235 where the object is pre-played to determine the duration rate. Process block 235 allows the object to be played while the time for completion is registered to determine the object. The process proceeds from block 235 to block 240 where the duration is determined and associated to the object. Returning to block 230 if it determined that the duration is to be calculated from the device rate the process again proceeds to block 240 where the duration is determined and associated with the object. The process continues from block 240 to block 245 where a posting criteria table is accessed, this process allows the calendar to be scanned according to a user specified criteria for posting an event to a calendar. Returning to block 225, if it is determined that the duration is already specified with the object, such a case can occur as specified in FIG. 2, block 160, the process again continues to block 245. The process proceeds from block 245 to block 250 where the electronic calendar is scanned according to the criteria as accessed in block 245.

The process proceeds from block 250 to block 255 which determines whether a free time slot is available for posting the object as a calendar event. It should be noted that a free time slot can be defined by a user criteria, thus permitting an overlap of events to occur when a complete rage of time is not available for the complete duration to playback the object. If no available slot is found on the calendar the process proceeds to block 260 where the user is notified that no available slot exist for posting a playback event for the object. Such notification may be through audio output device, 130 or visually displayed through display device 126. The process proceeds from block 260 to block 285 where once again the process relinquishes control to electronic mail services. The process continues from 285 to block 290 where the process terminates.

Returning to block 255, if an available free time slot is available then the process continues to block 265 where the playback duration time of the object is posted to the electronic calendar as a scheduled event. The process continues from block 265 to block 270 where a determination is made as to whether the newly scheduled event should have an electronic reminder generated for the scheduled event. If it is determined that a reminder is to be generated as can be specified in FIG. 2, block 170. The process continues to block 275 where an electronic reminder request is registered with an electronic reminder service with associated lead times as defined from date and time parameters of the request. The process continues to block 280 where the user is notified that an electronic reminder will be generated for the scheduled event. Returning to block 270 if it is determined that no reminder is to generated for the scheduled event then controls again passes to block 280 where the user is notified that no reminder will be generated. Those skilled in the art recognized that the notification may be a null notification for users who no desire to be notified of the absence of an electronic reminder for the event.

Returning to block 280, the process continues to block 285 where once again the process relinquishes control to electronic mail services. The process then continues to block 290 where the process terminates.

What is claimed is:

1. A data processing system, for scheduling the playback of a data object having a playback duration to an electronic calendar, the system comprising:

means for determining the playback duration of the data object; and means for determining whether an available free time slot of at least said duration exists on said electronic calendar for the playback of the data object; and means of posting partial playback of said data object as an event on said electronic calendar in an available time slot.

2. The data processing system of claim 1, further comprising means for registering a data object for invocation of scheduling said isochronous data object for playback as a calendar event.

3. The data processing system of claim 1, further comprising means for registering said data object for generating an electronic reminder for playback of said data object.

4. The data processing system of claim 1, further comprising means for notifying the owner of a calendar containing the calendar event that a data object has been scheduled for playback.

5. The data processing system of claim 1, further comprising means for notifying a user of a data processing system the generation of an electronic reminder for the playback of said data object.

6. The data processing system of claim 1, wherein said scheduling for determining the playback duration is initiated by an electronic mail service upon reception of said data object within said electronic mail service.

7. The data processing system of claim 1, further comprising means for determining criteria for scheduling said data object to an electronic calendar.

8. The data processing system of claim 1, wherein said means for determining the duration includes the means for preplaying said data object.

9. The data processing system of claim 1, wherein said means for determining the duration include means for applying a display rate to the data object.

* * * * *